US010060313B2

(12) United States Patent
Archetti

(10) Patent No.: US 10,060,313 B2
(45) Date of Patent: Aug. 28, 2018

(54) PARTICULATE FILTERING APPARATUS FOR MARINE DIESEL ENGINES AND METHOD OF OPERATION AND REGENERATION OF SAID APPARATUS

(71) Applicant: ECOSPRAY TECHNOLOGIES S.R.L., Voghera (IT)

(72) Inventor: Maurizio Archetti, Verscio (CH)

(73) Assignee: Ecospray Technologies S.R.L., Voghera (IT)

( * ) Notice: Subject to any disclaimer, the term of this patent is extended or adjusted under 35 U.S.C. 154(b) by 680 days.

(21) Appl. No.: 14/404,765

(22) PCT Filed: May 31, 2013

(86) PCT No.: PCT/IB2013/054499
§ 371 (c)(1),
(2) Date: Dec. 1, 2014

(87) PCT Pub. No.: WO2013/179266
PCT Pub. Date: Dec. 5, 2013

(65) Prior Publication Data
US 2015/0143994 A1 May 28, 2015

(30) Foreign Application Priority Data
Jun. 1, 2012 (IT) .............................. MI2012A0952

(51) Int. Cl.
F01N 3/02 (2006.01)
F01N 3/023 (2006.01)
(Continued)

(52) U.S. Cl.
CPC ......... *F01N 3/0233* (2013.01); *F01N 3/0222* (2013.01); *F01N 3/0232* (2013.01);
(Continued)

(58) Field of Classification Search
CPC .... B01D 46/44; B01D 53/0446; B01D 53/08; B01D 2251/304; B01D 2251/606;
(Continued)

(56) References Cited

U.S. PATENT DOCUMENTS 5,178,652 A * 1/1993 Huttlin ............... B01D 46/0021
55/302
5,616,171 A * 4/1997 Barris ................ B01D 46/0068
55/282.3
(Continued)

FOREIGN PATENT DOCUMENTS

| EP | 0674098 A1 | 9/1995 |
| EP | 2415982 A1 | 2/2012 |
| WO | 2006002037 A2 | 1/2006 |

OTHER PUBLICATIONS

International Search Report and Written Opinion for corresponding application No. PCT/IB2013/054499 dated Nov. 15, 2013.

*Primary Examiner* — Duane Smith
*Assistant Examiner* — Minh-Chau Pham
(74) *Attorney, Agent, or Firm* — LeClairRyan PLLC

(57) ABSTRACT

A particulate filtering apparatus for dry filtering exhaust gases of a diesel engine includes at least two compartments independently arranged in parallel with respect to a flow of the exhaust gases. Each of the compartments is equipped with at least one shut-off valve for regulating the flow of gas passing through the compartment and further includes one or more filters adapted to hold the particulate and an emission device to generate a countercurrent gas pulse flow at the one or more filters. A central control unit operates and controls the at least one shut-off valve and of said emission device. Each of the at least two compartments further includes an injector operably controlled by the central control unit for the inlet of hot gases into the at least two compartments.

13 Claims, 1 Drawing Sheet

(51) Int. Cl.
  *F01N 3/032* (2006.01)
  *F01N 13/00* (2010.01)
  *F01N 3/30* (2006.01)
  *F01N 3/022* (2006.01)

(52) U.S. Cl.
  CPC ........... *F01N 3/0234* (2013.01); *F01N 3/032* (2013.01); *F01N 3/306* (2013.01); *F01N 13/011* (2014.06); *F01N 2330/06* (2013.01); *F01N 2590/02* (2013.01); *F01N 2590/08* (2013.01); *F01N 2610/02* (2013.01); *F01N 2610/08* (2013.01)

(58) Field of Classification Search
  CPC .......... B01D 2253/102; B01D 2253/25; B01D 2257/302; B01D 2257/404; B01D 2257/60; B01D 2258/0291; B01D 2259/40079; B01D 2259/40
  USPC .......... 55/302, 341.1, DIG. 34; 95/107, 280, 95/285; 96/138, 154, 417, 421, 423
  See application file for complete search history.

(56) References Cited

U.S. PATENT DOCUMENTS

| | | | | |
|---|---|---|---|---|
| 6,159,259 A * | 12/2000 | Maeda | ............... | B01D 46/0004 55/323 |
| 6,451,091 B1 * | 9/2002 | Avina | .................... | B01D 46/44 55/341.1 |
| 7,223,298 B2 * | 5/2007 | Platt | ................... | B01D 46/0004 210/340 |
| 2001/0037729 A1 * | 11/2001 | MacHida | ................ | F01N 3/023 95/278 |
| 2002/0014156 A1 * | 2/2002 | Leibold | ............. | B01D 46/0024 95/280 |
| 2009/0020012 A1 * | 1/2009 | Holten | ............... | B01D 46/0068 95/280 |
| 2013/0255485 A1 * | 10/2013 | Appelo | ................. | B01D 46/04 95/20 |
| 2013/0276628 A1 * | 10/2013 | Chalabi | ............... | B01D 46/0058 95/9 |

* cited by examiner

PARTICULATE FILTERING APPARATUS FOR MARINE DIESEL ENGINES AND METHOD OF OPERATION AND REGENERATION OF SAID APPARATUS

This application is a national stage application under 35 U.S.C. § 371 of PCT Application No. PCT/IB2013/054499, filed May 31, 2013, which claims the priority benefit of Italy Application No. MI2012A000952, filed Jun. 1, 2012.

FIELD OF THE INVENTION

The present invention relates to a particulate filtering apparatus for marine diesel engines and a method of operation and regeneration of said apparatus.

BACKGROUND OF THE INVENTION

As is known, large marine diesel engines use a heavy oil referred to as heavy fuel oil (HFO) as fuel. This oil is constituted by a mixture of paraffins and aliphatic hydrocarbons and with a high sulphur content (1%-3.5%)

The use of this fuel is substantially imposed on large ships for economic reasons, in that being an unrefined fuel and being of a lower quality with respect to the fuel used in diesel engines for automotive use, it an be purchased at a markedly lower cost. However, it also entails significant problems in terms of environmental pollution due to the pollutant content (sulphur, ashes, heavy metals, etc.)

According to what is known, the combustion of heavy oil generates high particulate loading (liquid, semi-liquid and solid microparticles) in the exhaust gases. The particulate can be constituted by unburned hydrocarbons which form the so-called soot, and/or by impurities, even inorganic impurities, initially present in the fuel, which form the ashes, combustion residues.

In order to prevent this particulate from being released into the atmosphere, particulate filters are employed in the automotive sector, which are able to retain the solid particulate by trapping it in the filter. The agglomerates tend to clog the filter, which generally has a construction of the honeycomb type, and it therefore cyclically necessary to provide for the regeneration of the filter itself, generally by proceeding with the further combustion of the agglomerates.

In the marine sector, namely for the large diesel engines with which ships are equipped, on the other hand, there is not currently any dry filtration of the particulate as the high content of impurities in the naphthas used makes the use of particulate filters of the type currently used in the automotive sector substantially impossible, as they would immediately clog due to the high presence of non-combustible particulate in the exhaust fumes. In addition, these particulate filters, which generally use oxidising catalysts to improve oxidation of the organic fraction, and thus the combustion of soot, in the event of these being used in marine engines that burn diesel fuel containing sulphur, would result in oxidation of the $SO_2$ to $SO_3$, further increasing the particulate to an excessive extent. $SO_3$ is a compound, which condenses in the presence of water vapour and temperatures below 200° C., forming a sulphuric acid aerosol. Once emitted to the funnel, this aerosol produces a very visible brownish-blue plume that in fact increases the total particulate emission (liquid and semi-liquid) with respect to the case of the absence of the particulate filter. The micro and sub-micron dimensions of this aerosol prevent its removal by means of a possible seawater scrubber present in the exhaust system. Thus, no dry filtering system of the exhaust gases of marine diesel engines is currently used, while a "wet" filtering system is used to eliminate the particulate and the $SO_2$ namely by means of the use of countercurrent "scrubbers" that use seawater directly, in accordance with the teachings of the prior art, to eliminate the particulate material and absorb the acid pollutants.

The efficacy of the "scrubber" on the particulate matter is however somewhat limited and is also limited to transferring the particulate from the gaseous phase to the liquid phase polluting the seawater used therein. The seawater leaving the "scrubber", which is dispersed in the sea, contains, oils, polycyclic aromatic hydrocarbons—also known by the acronym PAH—which have known adverse effects on the environment (evident toxicity to certain aquatic organisms and birds, high chronic toxicity to aquatic life, contamination of agricultural crops), and on human health, heavy metals, such as vanadium, chromium, cadmium, nickel and many more, as well as ashes.

SUMMARY OF THE INVENTION

The present invention therefore aims to resolve these issues by providing a particulate filtering apparatus that can, in particular, be used with marine diesel engines, which, as has been said, use low quality fuel, allowing a dry filtration of exhaust gases that is more efficient than wet filtration currently used in the sector and, which does not cool the gases so as to make a heat recovery possible without the problems of fouling the boilers used. The treated gas can thus be purified with seawater scrubbers to remove the $SO_x$ without polluting the water used with the above-mentioned hazardous compounds.

Within this aim, the object of the present invention is to provide a particulate filtering apparatus for the dry filtering of the exhaust gases of marine diesel engines that is able to eliminate or at least reduce the particulate in the exhaust gases without generating high head losses so as not to adversely affect engine performance.

A further object of the present invention is to provide an extremely reliable particulate filtering apparatus for the dry filtering of the exhaust gases of marine diesel engines, so that the engine does not have to be stopped for maintenance interventions.

Not least, the object of the present invention is to provide a particulate filtering apparatus for the dry filtering of the exhaust gases of marine diesel engines of small dimensions, so as to allow easy installation on board the naval unit.

A further object of the present invention is to remove soot from the exhaust gases so that the efficiency of the energy recovery boiler located in the exhaust system of the engine remains high over time thus reducing fouling on the exchange surfaces.

A further object of the present invention is to provide a method for the operation and regeneration of a particulate filtering apparatus for the dry filtering of the exhaust gases of marine diesel engines that allows the drawbacks of the wet filtering systems known in the prior art to be overcome.

This aim and these and other objects that will become clearer below are achieved by a particulate filtering apparatus for the dry filtering of the exhaust gases of diesel engines, particularly for applications on marine diesel engines, according to the accompanying claim 1. In particular, the filtering apparatus according to the present invention is characterised in that it comprises at least two independent compartments arranged in parallel to the flow of the exhaust gases, each of said independent compartments comprising one or more filtering means adapted to retain the particulate, ceramic elements with wall-flow, ejector means adapted to generate a countercurrent flow of compressed air with respect to the work-flow of the ceramic elements, being provided at each of said ceramic elements or at groups of said elements, each of said compartments further comprising at least one shut-off valve adapted to control the flow of gas through the relevant compartment.

In addition, these aims and objects are achieved by a method for the operation and regeneration of said filtering apparatus.

BRIEF DESCRIPTION OF THE DRAWINGS

Further characteristics and advantages of the present invention shall become clearer from the following detailed description, provided by way of a non-limiting example and illustrated in the accompanying drawings, wherein.

DETAILED DESCRIPTION OF THE INVENTION

Figure 1:
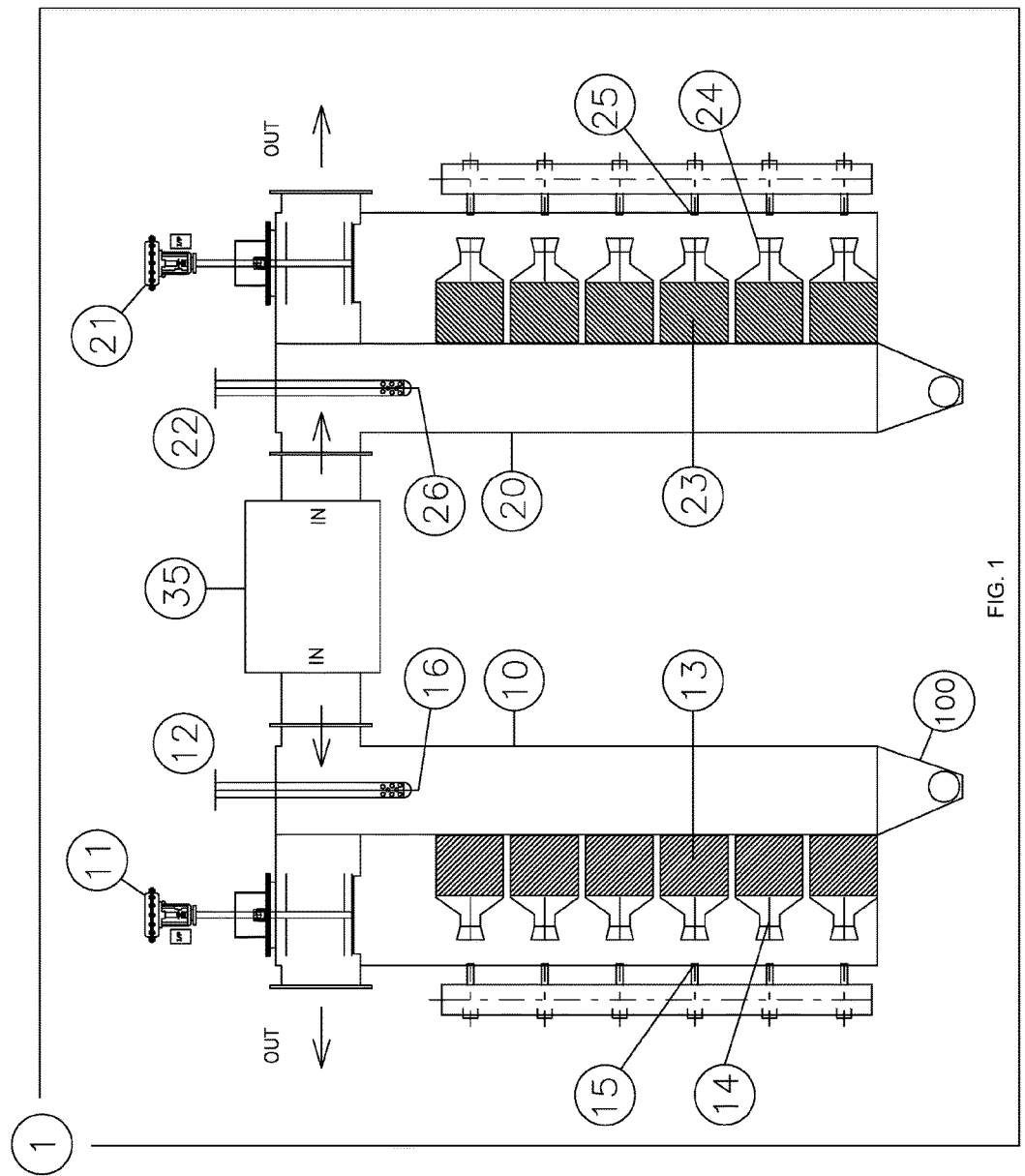
FIG. 1 shows a schematic view of the two adjacent compartments of the particulate filtering apparatus according to the present invention.

The particulate filtering apparatus 1 according to the present invention comprises a plurality of compartments 10, 20 arranged in parallel with respect to the flow of the exhaust gases. The flow of the exhaust gases entering the compartment 10 is schematically shown by the IN arrow in FIG. 1, which indicates the flow entering in the compartment 10 from the inlet conduit 35.

Each of said compartments 10, 20 is equipped with a shut-off valve, respectively indicated by the reference numbers 11 and 21 in the example of FIG. 1, adapted to adjust, and if necessary to stop, the gas flow through the relevant compartment. The flow lines in FIG. 1 represent the path of the gas passing through a compartment, in particular the compartment 10 the filter operation of which will be described below. The one or more other compartments will have an analogous structure, and what is shown herein with reference to the compartment 10 can also be taken as valid for the other compartments, for compartment 20 shown in FIG. 1 as well as for the other compartments that are not shown in the drawings.

Returning thus to the description of the compartment 10 illustrated in FIG. 1, in its path that goes from the inlet conduit 35 of the exhaust gases to the shut-off valve 11, located on the outlet conduit of the exhaust gases from the compartment, the gas is forced to pass through the filtering means 13.

The filtering means comprise a plurality of monolithic ceramic elements 13 with wall-flow arranged in parallel and in a suitable number for treating with the overall flow of the exhaust gases affecting the compartment. Each of said ceramic elements is constituted in practice by a monolithic ceramic element divided into parallel channels with fairly contained sections, in the region of a few millimeters, for the passage of the gases, which are forced to pass from one channel to another with a tangential flow component, thus minimising clogging of the filter yet, at any rate, allowing the particulate to be retained. Similar monolithic ceramic filters are already in use in particulate filters for the automotive sector and will therefore not be further described herein as of a type known in the prior art. It is however highlighted that those used in producing the filter according to the present invention are specifically devised for use with the sulphur-containing fuels used by marine diesel engines, and that numerous monolithic elements are used in each compartment 10, 20 of the filter according to the present invention, arranged in parallel.

According to what is shown in the accompanying FIG. 1, the filtering means are associated with compressed air injectors 15 and ejectors 14, suitable for generating an intense countercurrent gas pulse flow with respect to the work flow of the ceramic element, i.e. with respect to the flow of the exhaust gases that pass through the ceramic elements during filter operation.

Even more in particular, preferably a nozzle 15 and an ejector 14 are located at a group of ceramic elements 13, and more preferably still, as shown in FIG. 1, they are placed at each ceramic element 13 so as to optimally flow into the latter with the countercurrent compressed air flow. The countercurrent flow, generated by these jets of compressed air with pressure equal to or greater than the 3 bar, is capable of removing the particulate from the ceramic elements, during the regeneration of the filter, which will be better illustrated below.

According to what is shown in FIG. 1, each compartment according to the present invention has a vertical development. The exhaust gases enter the inlet conduit 35, pass through the ceramic members 13, which constitute the particulate filtering means, and continue towards the upper part of the compartment 10. According to the orientation shown in the accompanying FIG. 1, the shut-off valve 11 is provided in the upper zone of the compartment 10. The shut-off valve 11 is operated by a pneumatic or electric actuator, and is controlled by a central control unit that the filtering unit 1 is equipped with and which, as will be better described below, controls its operation.

In the lower portion of the filtering apparatus according to the present invention, each compartment is in communication with an accumulation hopper 100 which collects the particulate that is removed by the ceramic filtering elements 13 by effect of the jets of compressed air emitted by the injectors 15 and amplified by the nozzles 14.

Each compartment 10, 20 of the particulate filter 1 according to the present invention preferably further comprises injector means 12, 22 adapted to emit hot gases into the compartment.

Said hot gases preferably consist of air, which is preheated by means of a burner or an electric heater at a temperature of about 400-700° C. Said hot gases will be indicated in the remainder of the present description as "heated" gas, to distinguish them from the exhaust gases to be treated.

With reference to FIG. 1 and to the compartment 10, the injector means 12 are preferably but not necessarily arranged in the upper part of the compartment, but at any rate in proximity of the inlet section of the gas to be filtered. The purpose of the injector means which provide the possibility of injecting gas "heated" at a high temperature into the compartments of the filter according to the present invention will become clearer from the following description of filter operation and of the regeneration of its filtering components.

The operation of the particulate filter according to the present invention is thus as follows.

As mentioned, the filter according to the present invention comprises at least two, preferably four, even more preferably eight, independent compartments (two compartments are illustrated in FIG. 1, indicated by the reference numbers 10 and 20) arranged in parallel with respect to the flow of the gas to be treated. Each of which comprises filtering means 13, of the type comprising ceramic monoliths with wall-flow arranged in parallel, and emission means of pulse flow of compressed air, comprising injectors 15, 25 and ejectors 14, 24 to amplify said flow, said emission means providing said filtering means 13 with a countercurrent flow of gas with respect to the direction of the flow of the exhaust gases.

To ensure the continuous and efficient operation of the particulate filter according to the present invention, the filter means must be regenerated.

It is indeed known that the greatest issue afflicting the particulate filters used in the automotive sector consists of the fact that after a certain number of hours of operation, the filtering elements of the filter tend to increase the back pressure on the engine exhaust in that they clog the non-combustible particulate that they retain thus increasing engine consumption and making its operation impossible, in a short period of time, until it stops altogether. Operation of the filter is based on the fact that the particulate present in the exhaust gases remains trapped in the filtering elements, thus being removed by the exhaust gases, but, at the same time, clogging the filter itself. The problem is therefore inevitable and it is overcome by means of the so-called regeneration.

The regeneration methods used in the filters in use in the automotive sector where the temperature of the exhaust gases is simply increased by means of excess fuel or auxiliary burners so as to trigger and therefore burn the particulate trapped in the filter itself, would not effective in the marine sector since the high presence of non-combustible ashes would lead to the rapid and irreversible clogging thereof. The high concentrations of sulphur in the fuel thus greatly increase the non-combustible particulate due to the generation of sulphates that are deposited on the soot particles. The high concentrations of sulphates and ashes and the ignition temperature of the organic particulate, make heat regeneration difficult.

The filtering apparatus according to the present invention thus comprises more than one compartment 10, 20 arranged in parallel so that the control unit may cyclically proceed with regeneration of the filtering means 13, 23 of one compartment while the flow of the exhaust gases is diverted and filtered by the other compartments, without interrupting filter operation.

According to the preferred embodiment described herein, when the control unit detects an increase of filter head losses above a predetermined threshold value, the shut-off valve on the gas outlet conduit of a compartment is closed thus isolating the compartment from the filtration process as the flow of the exhaust gases will no longer cross the filtering elements 13 but will instead be divided between the other compartments, which are arranged in parallel.

If the filtering apparatus according to the present invention should include just two compartments, for example compartments 10 and 20, by closing the shut-off valve 11 of compartment 10, the entire flow of the engine exhaust gases would only cross compartment 20, which would continue to filter the exhaust gases, operating, however with an extremely high loss of head.

In order to maintain the head losses within acceptable values, thus increasing the efficiency of the filtering system, the filter according to the present invention preferably comprises more than two compartments. In particular, the embodiment of a filter comprising eight compartments is preferred. In this case, when the shut-off valve of a compartment is closed for regeneration of its filtering means, if Q is the overall flow of the exhaust gases, it is distributed among the other seven other compartments filtering the value equal to ⅛ of Q that related to the compartment excluded from filtration. This flow rate of ⅛ of Q is divided among the other seven compartments and the modest increase in the flow rate therefore allows a limited increase of the head losses in the seven compartments affected by the filtration. It is clear that the filter according to the present invention may in any case operate with any number of compartments, two being the minimum number.

The compartment excluded from the filtration can at this point be regenerated. It will be illustrated herein how the regeneration of the compartment 10 illustrated in FIG. 1 occurs. The regeneration of course occurs in the same way for all of the compartments, which have the same structure.

Once the shut-off valve 11 has been closed, the compartment 10 is excluded from filtration, in the sense that the flow of the exhaust gases no longer passes through the plenum of the compartment 10 and therefore no longer passes through the monolithic filtering elements 13.

At this point, the compressed-air nozzles 15 and the ejectors 14 generate a flow of compressed air, preferably a pulse flow, which flows into the filtering elements 13 in countercurrent freeing the channels of the ceramic element of the particulate that has accumulated therein. The particulate thus freed falls by gravity and accumulates in the gas-tight accumulation hopper 100, which will be periodically emptied for the disposal, in the appropriate manner, of the particulates collected.

Should the compartment remain under filtration during the regeneration operations described herein, the flow of the exhaust gases would again drag the particulate removed by a filtering element 13 onto the other elements, making the decanting of the particulate matter into the inlet plenum of the compartment 10 and the subsequent collection in the hopper, in fact impossible.

The action previously described can of course be repeated several times to ensure a more effective removal of the powders from the filtering elements 13.

This substantially mechanical action has shown that it is possible to obtain excellent cleaning of the filtering elements 13, in particular as mentioned, when these are in the form of monolithic elements with wall-flow, of the ashes that constitute the particulate.

There is nevertheless another type of particulate that accumulates on the filtering elements 13: the so-called soot.

The term soot indicates that part of the particulate constituted by hydrocarbons or complexes of unburned hydrocarbons, which namely, for reasons relating to the quality of the fuel or to the efficiency of the engine, are not burned in the operating cycle of the engine itself.

In order to also completely eliminate this part of the particulate, the regeneration of the filter according to the present invention also provides for a gas "heated" at a high temperature, with high temperature meaning a temperature close to 400° C. or above, is to be introduced, by means of the injector means 12, into the plenum of the compartment 10.

At this point, the shut-off valve 11 is partially opened, thus opening the passage of the gases into the outlet conduit of the exhaust gases from the compartment, sufficiently to allow the flow of "heated" gas introduced into the compartment by the injection means 12 through the filtering means 13 in the same direction with which the exhaust gases pass through the filtering means when the filtering element is operational, thus allowing said "heated" gases to leave the compartment.

The "heated" gases introduced into the compartment can be constituted by pure hot air or by combustion gas at high temperature generated by an auxiliary burner containing oxygen and possibly oxidising compounds such as $NO_2$, hydrogen peroxide and the like, and therefore capable of burning, at a temperature between 350 and 700° C., any soot not removed from the filtering surface by the previously described mechanical regeneration.

Thanks to the division into compartments of the filter and to the partial closure of the compartment, the flow of air/hot gas is limited, and is lower than the normal work flow, thus allowing high energy savings by reducing the heat rating used for the heat regeneration.

In addition, according to a preferred embodiment of the filter and of the method of operation and regeneration according to the present invention, when the shut-off valve 11 of the compartment 10 is closed in order to proceed with the regeneration, the flow of exhaust gases from the engine, which generally have a temperature close to 300-350° C., is reduced but not reduced to zero. The inlet flow rate to the compartment is reduced by 30-70% with respect to the normal flow rate, preferably bringing it to values close to 35% of the normal filtration flow rate. The reduced flow of the exhaust gases thus also allows, as an option, the nebulisation of an oxidising reagent in an aqueous solution into the compartment itself, in particular against said filtering means 13 by means of dual-fluid nozzles 16, without it totally evaporating before affecting the filtering elements 13, thereby allowing the droplets of oxidising reagent, with average diameter less than 500 microns, to reach the filtering surface in a liquid state, according to the teachings of European patent application no. 11176254.8 entitled "Apparatus and method for regenerating particulate filters for internal combustion engines", in the name of the Applicant.

The contemporaneous use of cleaning with compressed air and/or oxidising reagent and air/hot gases according to the method according to the present invention allow optimisation of the regeneration of the particulate filter.

For example, the particular heat regeneration described above carried out following "mechanical" cleaning of the particulate from the filtering elements by means of compressed air, gives rise to a reduced heat load (due to the lesser amount of soot burned). The danger of any uncontrolled regenerations due to an excess of soot that burns on impact with the hot gases of heat regeneration is also reduced.

This allows the ceramic filtering elements to be preserved from mechanical failures due to the excessive heat load and localised temperature increases.

The filter apparatus thus devised and described and the method of operation and regeneration of said filter thus achieve the intended aim and objects.

It has in particular been seen that the apparatus and the method of operation and regeneration of said apparatus allow operation of the filtration even in the presence of high amounts of sulphur and ashes in the fuel.

In addition, the filtering apparatus according to the present invention allows low head loss values to be maintained thus ensuring that engine operation is not adversely affected, and is also particularly reliable.

A further advantage of the present invention consists of the small dimensions of the filtering apparatus, which allows easy on board installation. It is also possible to provide for a heat recovery boiler, downstream of the apparatus itself, which operates on particulate-free smoke and thus operates with maximum efficiency. It is also possible to provide for a "scrubber that uses seawater or water recirculated with alkaline reagent", downstream of the apparatus itself, for removal of the SOx contained in the exhaust gases without the need for expensive treatments of the effluent seawater.

A possible exhauster fan placed on the exhaust line downstream of the particulate filter allows the back pressure to the engine to be maintained below the maximum limits. This fan at the same time allows the dimensions of the particulate filter itself to be reduced as is possible to operate with head losses (and therefore high filtration speeds) above the filter as they are offset by the prevalence of the fan.

The filtering apparatus according to the present invention is also protected against uncontrolled regenerations that could lead to mechanical failure of the filtering elements, and at the same time does not excessively increase engine fuel consumption.

A number of modifications can be made by those skilled in the art without departing from the scope of protection of the present invention, determined by the scope of the claims, which are an integral part of this text and are therefore referenced in their entirety.

The scope of protection of the claims must not thus be restricted to the illustrations or to the preferred embodiments provided by way of example in the description; the claims must instead include all the characteristics of patentable novelty arising from the present invention, including all the characteristics that are deemed equivalent by a person skilled in the art.

The invention claimed is:

1. A particulate filtering apparatus for dry filtering exhaust gases of a diesel engine comprising:
    at least two compartments independently arranged in parallel with respect to a flow of the exhaust gases, each of the compartments being equipped with a shut-off valve, each of the at least two compartments further comprising one or more filters adapted to hold the particulate, an emission device, and an injector device; and
    a central control unit for the operation and control of the shut-off valve for each of the compartments to regulate the flow of gas passing through the compartment, the emission device to generate a countercurrent gas pulse flow at the one or more filters, and the injector, for the inlet of hot gases separate from the exhaust gases into the pair of compartments, wherein when the emission device generates the countercurrent gas pulse flow the shut-off valve for each of the compartments is closed, and when the injector inlets the hot gases the shut-off valve for each of the compartments is at least partially open.

2. The filtering apparatus according to claim 1, wherein the one or more filters comprise one or more monolithic ceramic elements with wall flow.

3. The filtering apparatus according to claim 2, wherein there are more than two of the monolithic ceramic elements arranged parallel to each other with respect to the flow of gas passing through the compartment.

4. The filtering apparatus according to claim 3, wherein the emission device comprises injectors and ejectors that generate the countercurrent gas pulse flow at the one or more filters, which removes ash accumulated on the one or more filters.

5. The filtering apparatus according to claim 1, wherein the injector further comprises a nebulizer device for the nebulization of an oxidizing reagent in an aqueous solution.

6. The filtering apparatus according to claim 5, wherein the hot gases comprise air preheated at a temperature between 400 and 700° C.

7. The filtering apparatus according to claim 6, wherein each of the at least two compartments is in communication with a hopper for collecting the particulate.

8. A method for regenerating a filtering apparatus comprising:
providing a particulate filtering apparatus for dry filtering exhaust gases of a diesel engine comprising, the particulate filtering apparatus comprising:
at least two compartments independently arranged in parallel with respect to a flow of the exhaust gases, each of the compartments being equipped with a shut-off valve, each of the at least two compartments further comprising one or more filters adapted to hold the particulate, an emission device, and an injector device; and
a central control unit for the operation and control of the shut-off valve for each of the compartments to regulate the flow of gas passing through the compartment, the emission device to generate a countercurrent gas pulse flow at the one or more filters, and the injector, for the inlet of hot gases separate from the exhaust gases into the pair of compartments, wherein when the emission device generates the countercurrent gas pulse flow the shut-off valve for each of the compartments is closed, and when the injector inlets the hot gases the shut-off valve for each of the compartments is at least partially open;
acting, by the central control unit, on the shut-off valve of the compartment to be regenerated, operating a closure of the valve stopping the flow of the exhaust gases through the compartment;
operating, by the central control unit, the emission device to emit the countercurrent flow of pressurised gas or a countercurrent pulse of pressurised gas at the filter;
operating, by the central control unit, the injector to introduce the hot gases into a plenum of the compartment to be regenerated;
acting, by the central control unit, on the shut-off valve of the compartment to be regenerated, to open the shut-off valve to permit the flow of the hot gases injected through the nozzles to pass through the one or more filters; and
collecting the particulate in the hopper.

9. The method according to claim 8, wherein operating the injector further comprises the step of operating the nebulizer for the nebulization of an oxidizing reagent in an aqueous solution, which comprises the nebulization of an oxidizing reagent in an aqueous solution in the compartment to be regenerated.

10. The filtering apparatus according to claim 1, wherein the diesel engine is a marine diesel engine.

11. The method according to claim 8, wherein the diesel engine is a marine diesel engine.

12. The filtering apparatus according to claim 1, wherein the injector of each compartment is positioned to deliver the inlet of hot gases into the at least two compartments along a same direction as the flow of the exhaust gases through the one or more filters.

13. The method according to claim 8 further comprising:
operating at least a partial aperture of the valve and injecting hot gases into the compartment to be regenerated in a same direction along which, during operation of the filtering apparatus, the hot gases flow through the filter of the compartment.

* * * * *